Feb. 10, 1970   M. EVANS   3,494,016
PIPE JOINING DEVICES
Filed Aug. 7, 1968
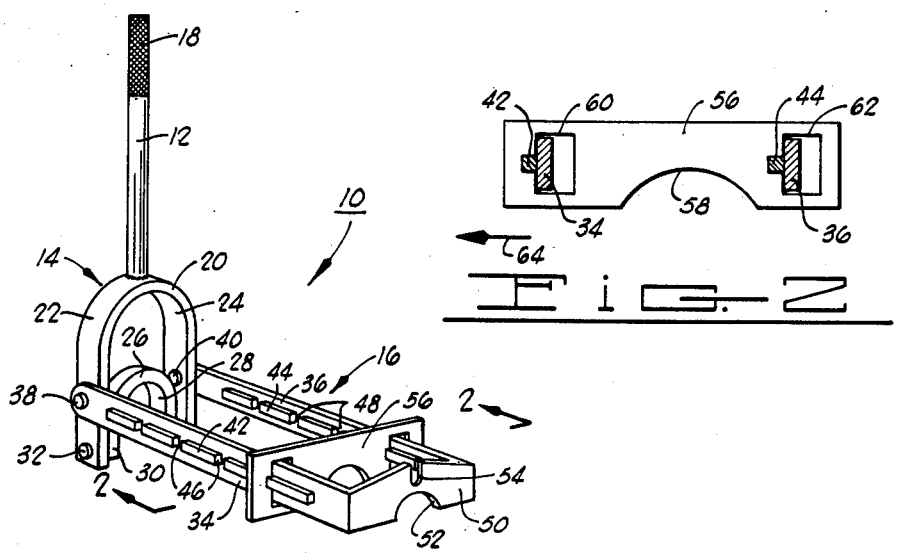
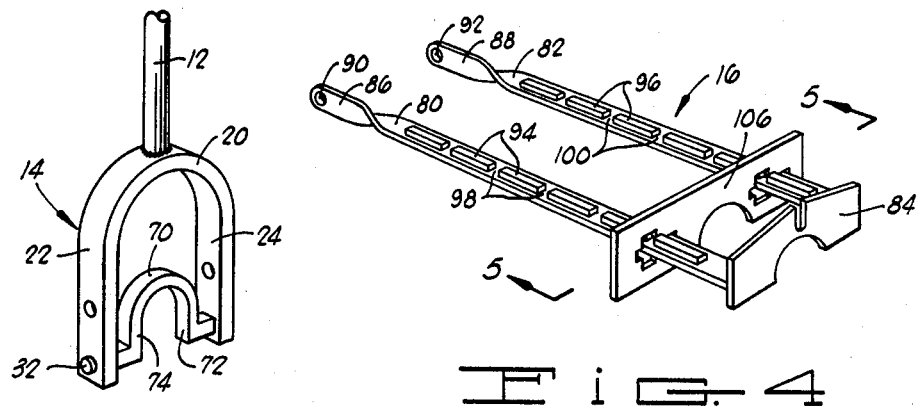
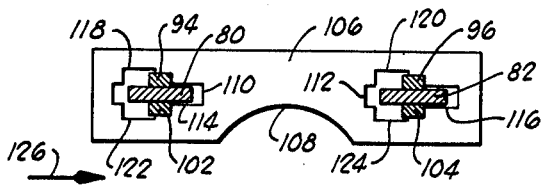
INVENTOR.
MONROE EVANS
BY
Dunlap, Laney & Hessin
ATTORNEYS

United States Patent Office 3,494,016
Patented Feb. 10, 1970

3,494,016
PIPE JOINING DEVICES
Monroe Evans, 1716 S. Everest,
Oklahoma City, Okla. 73111
Continuation-in-part of application Ser. No. 722,953, Apr. 22, 1968. This application Aug. 7, 1968, Ser. No. 750,871
Int. Cl. B23p 19/04
U.S. Cl. 29—237                                    9 Claims

ABSTRACT OF THE DISCLOSURE

Apparatus for joining pipe sections of the bell and spigot joint type which consists of a lever and yoke assembly which bears on a bell type end to coact with a puller assembly such that it draws the spigot end of a pipe section into engagement with the bell end. The puller assembly is constructed to be of narrow physical dimension with a minimum of moving parts while retaining the capability of being adjustable as to the length of pipe sections being joined to a pipe string.

CROSS-REFERENCE TO CO-PENDING APPLICATION

The present application is a continuation-in-part of the co-pending U.S. patent application Ser. No. 722,953 entitled "Pipe Joining Device," filed on Apr. 22, 1968 in the name of Monroe Evans.

BACKGROUND OF THE INVENTION

Field of the invention

The invention relates generally to pipe pulling apparatus and, more particularly, but not by way of limitation, it relates to improvements in pipe pulling apparatus of the specific type disclosed in the afore-mentioned patent application.

Description of the prior art

The prior art includes various types of pipe joining or pulling mechanisms which serve to tightly engage pipe joints of the bell and spigot variety. Such prior known pipe joining tools are best characterized by U.S. Patents Nos. 3,036,372 and 3,096,572, each of recent issue. These patents provide a joining device for use with longer sections of soil pipe or such and the tools are primarily designed for use in joining in situ, i.e. as horizontally disposed along the bottom of a prepared trench. Accordingly, the characteristic structures of prior teachings have been influenced by exigencies of usage and thus are adapted for joinder of longer pipe strings as employed in straight or extended conduit lines.

SUMMARY OF THE INVENTION

The present invention contemplates improvements in pipe pulling apparatus for joining or disconnecting bell and spigot type soil pipe sections of any length and configuration. In a more limited aspect, the invention consists of a handle bar rigidly secured to a lever yoke which is pivotally affixed to opposite sides of a brace yoke which is shaped to bear about the outer flange surface of a pipe bell. The lever yoke is then pivotally affixed to a pair of sideplates each having a raised portion with a plurality of cut-out spaces therealong. A puller plate is slidable along said side plates for rigid affixture within selected ones of the cut-outs to set the length of the puller plate relative to said lever and brace yokes for desired pipe joinder application. Still a further improvement consists of a modified brace yoke which can be easily inserted in a lever yoke such that the pipe pulling apparatus is readily usable for any of various sizes of soil pipe.

Therefore, it is an object of the present invention to provide a pipe joining tool for use with soil pipe of various lengths and configuration which is more easily adjusted into secure affixture for use in a given joinder operation.

It is a further object of the present invention to provide apparatus which may be easily handled by a single operator to join or disengage soil pipe sections in closed or tight spaces and in any of vertical, horizontal, or other attitudes.

Finally, it is an object of the present invention to provide improved apparatus capable of operatively gripping all forms and sizes of cast iron or such soil pipe sections.

Finally, it is an object of the present invention to provide improved pipe pulling apparatus which is capable of either joinder or disconnection of cast iron soil pipe sections.

Other objects and advantages of the invention will be evident from the following detailed description when read in conjunction with the accompanying drawings which illustrate the invention.

BRIEF DESCRIPTION OF THE DRAWINGS

FIG. 1 is a perspective view of a pipe joining device employing a first side plate modification;

FIG. 2 is a section taken along lines 2—2 of FIG. 1 to depict a first form of modified puller plate;

FIG. 3 is a perspective view of a lever yoke such as shown in the puller assembly of FIG. 1 and illustrating a modified form of brace yoke;

FIG. 4 is an alternative form of side plate structure which may be employed as the puller assembly in the device of FIG. 1; and FIG. 5 is a section taken along lines 5—5 of FIG. 4 illustrating the alternative form of puller plate.

DESCRIPTION OF FIRST EMBODIMENT

Referring now to FIG. 1, a pipe joining device 10 consists of a handle 12 which is attached to a yoke assembly 14 to manipulate a puller assembly 16. The handle 12 consists of a metal bar which may have a knurled gripping portion 18. And the other end is rigidly secured to the bowed end of a U-shaped lever yoke 20 of yoke assembly 14. The lever yoke 20 extends a pair of lever arms 22 and 24 outward and into parallel disposition. A semi-circular brace yoke 26 is formed to extend bifurcated ends 28 and 30 for pivotal connection to the ends of respective lever arms 22 and 24 by means of suitable pivot fasteners 32.

The puller assembly 16 is pivotally affixed to yoke assembly 14 so that it can be reciprocally moved in the horizontal direction. A pair of side plates 34 and 36 are pivotally secured to lever arms 22 and 24 by respective pivot fasteners 38 and 40. The disposition of pivot fasteners 38 and 40 along respective lever arms 22 and 24 will determine the length of stroke and this may be varied in accordance with exigencies of usage. That is, pivot fasteners 32 will actually provide a fulcrum axis such that variation of location of pivot fasteners 38 and 40 will change the length of the effective lever arm and, therefore, the horizontal stroke of puller assembly 16.

The side plates 34 and 36 are each formed with respective raised portions 42 and 44 having respective cut-outs 46 and 48 spaced therealong. For example, the raised portions 42 and 44 each may be formed by welding a piece of rod stock along the respective side plates 34 and 36, and the cut-outs 46 and 48 may be formed by sawing the rod stock away at specified points. The plurality of cut-outs 46 and 48 are preferably placed at selected, spaced points along side plates 34 and 36 in equi-spaced disposition. The outer end of side plates 34 and 36 is supported by an end plate 50 which is suitably secured thereacross as by welding. The end plate 50 may have a cut-out portion 52 which serves to alleviate interfering contact with pipe sections, and an upper and centrally located vertical slot 54 provides connection for a chain puller as set forth in the afore-mentioned co-pending patent application.

A puller plate 56 is disposed for adjustable affixture across the sideplates 34 and 36. As shown also in FIG. 2, the puller plate 56 is formed with a pipe access cutout 58 as well as oppositely disposed holes 60 and 62. The holes 60 and 62 are rectangular to have a vertical dimension very slightly greater than the height of side plates 34 and 36, and to have a horizontal dimension very slightly wider than twice the width of slide plates 34 and 36.

In operation, adjustment may be effected by sliding puller plate 56 in the direction of arrow 64 whereupon puller plate 56 is free to slide along side plates 34 and 36 out of interfering contact with raised portions 42 and 44; and upon selecting a proper length setting for the particular soil pipe which is being handled, the puller plate 58 can be returned in the opposite direction (from arrow 64), to engage within selected cut-outs 46 and 48 of respective raised portions 42 and 44.

The cut-outs 46 and 48 may be spaced along side plates 34 and 36 in accordance with the types and sizes of pipe which are generally encountered. Thus, the pipe puller assembly 10 can be employed for either joinder or disconnection of various soil pipe fittings, e.g. one-eighth bend, one-sixth bend, one-sixteenth bend, sanitary T, vent T, combination Y plus one-eighth bend, and many others, and merely by adjustment of puller plate 56 relative to brace yoke 26.

The clearance of holes 60 and 62 of puller plate 56 may be maintained fairly close but adequate to clear the vertical dimension of side plates 34 and 36 such that conscious manipulation enables easy adjustment of puller plate 56 to selected ones of respective cut-outs 46 and 48 along side plates 34 and 36, but the assembly is still resistant to falling out of affixture during usage. The particular configuration of side plates 34 and 36 as combined with the particular type of puller plate 56 enables easy manipulation of pipe puller assembly 10 in any of various attitudes without danger of the puller plate 56 becoming disengaged or unlocked. Thus, while puller assembly 16 will tend to stay engaged due to its close-tolerance, rectangular construction, it is still easy to change the setting by conscious manipulation with one hand while the opertor's remaining hand can continue to hold the pipe puller assembly in its proper operative attitude.

FIG. 3 shows an alternative form of yoke assembly 14 including a modified form of brace yoke 70 which enables the handling of smaller diameter soil pipe with the same standard pipe puller assembly 10 (FIG. 1). Thus, the adapter brace yoke 70 consists of a U-shaped brace member having yoke end members 72 and 74 which are formed to bend out perpendicularly for pivotal affixture at fasteners 32. The effective radius of brace yoke 70 can be made in any of several sizes to fit the well-known forms and standard sizes of soil pipe. Thus, it is contemplated that a complete unit would include the pipe puller assembly 10 with its maximum size brace yoke 26 plus a series of smaller radius brace yokes 70 which can be readily assembled into the unit. The pivot fasteners 32 may be such as a well-known form of threaded fastener or bolt which can be screwed into a yoke end portion 72 or 74 while being pivotally disposed through lever arms 22 and 24 of lever yoke 20.

FIGS. 4 and 5 show an alternative form of puller assembly 16 which may be employed in the pipe puller assembly 10 of FIG. 1. It is an aim to make puller assembly 16 readily adjustable with conscious manipulation by one hand while minimizing the likelihood that it should fall out of adjustment. Thus, due to the type of construction utilizing close-tolerance, rectangular interconnections, the puller assembly 16 can withstand a great degree of shaking at different attitudes without becoming disengaged from its selected adjustment.

The puller assembly 16 consists of a pair of side plates 80 and 82 which are disposed horizontally and affixed as by welding to an end plate 84. Each of horizontal side plates 80 and 82 receives a quarter-turn bend to extend pivot ends 86 and 88 having holes 90 and 92 for connection to yoke assembly 14. Referring also to FIG. 1, the pivot ends 86 and 88 would be pivotally affixed to respective lever arms 22 and 24 by means of the pivotal fasteners 38 and 40. The side plates 80 and 82 are formed with raised portions 94 and 96 secured therealong and having cut-outs 98 and 100, respectively, placed at selective positions therealong. Once again, raised portions 94 and 96 may be formed by welding suitable rod stock along the side plates 80 and 82 while cut-outs 98 and 100 may be formed at selected spacing by removing rod material.

As shown in FIG. 5, the underside of side plates 80 and 82 may also contain similar raised portions 102 and 104 which are formed with cut-outs (not specifically shown) similarly spaced therealong. It should be understood that, while both upper raised portions 94 and 96 and lower raised portions 102 and 104 are shown in the depicted embodiment, either one or the other may be utilized alone to give a similar although somewhat less positive locking adjustment.

The effective operating length of puller assembly 16 is set by a puller plate 106 which may be adjustably disposed at selected points along side plates 80 and 82. The puller plate 106 is formed with a first arcuate opening 108 along its under side to prevent unnecessary interference with the pipe sections which are being worked upon. Puller plate 106 also includes a pair of oppositely disposed holes 110 and 112, each of which is optimally formed or sized to provide a suitable compromise between easy adjustment manipulation and a capability to remain in adjustment through normal usage.

Holes 110 and 112 consist of respective horizontal rectangles 114 and 116 which are substantially wider than respective side plates 80 and 82 to be slidable therealong. The pair of upper openings 118 and 120 are formed in the upper side of rectangular holes 114 and 116 in off-set relationship such that raised portions 94 and 96 can either pass therethrough or provide locking affixture depending upon the lateral positioning of puller plate 106. A similar locking structure is provided for the bottom side of side plates 80 and 82, and this would consist of a pair of rectangular openings 122 and 124 formed along the bottom sides of respective rectangular holes 114 and 116.

The operation of the pipe puller assembly utilizing the puller assembly 16 of FIGS. 4 and 5 is similar to that previously described. Thus, when puller plate 106 is moved in the direction of arrow 126 it is free to slide along side plates 80 and 82 without interfering or coming into locking engagement with any of the upper raised portions 94 and 96 or lower raised portions 102 and 104. Then, and depending upon the particular size of fitting being joined or disconnected, an oppositely-disposed pair of cut-outs 98 and 100 will be selected whereupon puller plate 106 can be moved in the opposite direction from arrow 126 and thereby placed in locked adjustment for operative manipulation of the pipe puller device 10.

The foregoing discloses novel pipe joining apparatus and specific improvements related thereto, such apparatus serving to allow operation by a single man to place and join pipe sections of various lengths, configurations and spatial orientation. The device includes alternatives as to adjustable locking means for the puller assembly, each finding advantageous application in specific instances, and there is teaching of a specific form of brace yoke which can be interchanged for ready adaptation between different sizes of soil pipe. In essence, the device consists of a relatively compact apparatus capable of a wide range of usages in soil pipe handling applications to enable faster more positive couplings.

Changes may be made in the combination and arrangement of elements as heretofore set forth in this specification and shown in the drawing; it being understood, that changes may be made in the embodiment disclosed without departing from the spirit and scope of the invention as defined in the following claims.

What is claimed is:

1. Apparatus for joining a first pipe section having a bell-type end to a second pipe section having a spigot-type end, comprising:
    a lever yoke having a first end and being bifurcated into generally parallel spaced yoke arms terminating in second ends;
    handle bar means rigidly secured to said lever yoke first end in general alignment with said yoke arms;
    brace yoke means having first and second ends and being formed in semi-circular shape of radius slightly larger than said pipe section spigot-type end;
    fastening means for pivotally connecting each of said lever yoke arm second ends to respective ones of said first and second ends of the brace yoke means;
    first and second side plate means each having one end pivotally affixed to respective lever yoke arms at a point between said lever yoke first end and the respective yoke arm second ends, said first and second side plate means being spaced apart and each having a raised portion extending along its length, said raised portions each having a plurality of cut-outs spaced therealong; and
    puller plate means having first and second spaced slide holes which are slidable along said respective side plate means, said slide holes each including a portion projecting therein for engagement in selected cut-outs of each side plate means raised portion when said puller plate means is placed at a selected lateral disposition relative to said side plate means.

2. Apparatus as set forth in claim 1 which is further characterized to include:
    end plate means having the ends rigidly secured between said first and second side plate means, said end plate means having a vertical slot formed through one side thereof for attaching purposes.

3. Apparatus as set forth in claim 1 wherein said first and second side plate means each comprise:
    a pair of vertically disposed plates having said raised portions extending outward in the generally horizontal plane.

4. Apparatus as set forth in claim 1 wherein said first and second side plate means comprise:
    a pair of horizontally disposed plates having said respective raised portions extending therefrom in a generally vertical plane.

5. Apparatus as set forth in claim 3 wherein said puller plate means comprises:

plate means having said first and second slide holes, each of said slide holes being formed as a vertically disposed rectangle having a horizontal dimension slightly wider than the thickness of said slide plate means and its respective raised portion such that the puller plate can be moved to one side for sliding along said slide plate means and can be moved in the opposite direction for locking engagement within selected cutouts of each slide plate means.

6. Apparatus as set forth in claim 4 wherein said puller plate means comprises:
    a puller plate having first and second spaced slide holes, each slide hole being a horizontally extending rectangle having a vertical dimension slightly larger than said side plate means and raised portion, and having a horizontal dimension approximately one and one-half times as wide as said side plate means horizontal dimension, said slide holes each having additional rectangular openings formed in top and bottom sides thereof to allow passage of the raised portions therethrough when the puller plate is slid along the side plate means.

7. Apparatus as set forth in claim 1 wherein said brace yoke means comprises:
    semi-circular yoke means of predetermined radius and being formed with lateral bars extending outward from said first and second ends into rotatable affixture with respective ones of said lever yoke arm second ends.

8. Apparatus a sset forth in claim 5 wherein said brace yoke means comprises:
    semi-circular yoke means of predetermined radius and being formed with lateral bars extending outward from said first and second ends into rotatable affixture with respective ones of said lever yoke arm second ends.

9. Apparatus as set forth in claim 6 wherein said brace yoke means comprises:
    semi-circular yoke means of predetermined radius and being formed with lateral bars extending outward from said first and second ends into rotatable affixture with respective ones of said lever yoke arm second ends.

References Cited

UNITED STATES PATENTS

| | | | |
|---|---|---|---|
| 870,931 | 11/1907 | Claiborne | 29—237 |
| 1,870,607 | 8/1932 | Crane | 254—29 |
| 1,894,835 | 1/1933 | Smith | 29—234 |
| 2,122,099 | 6/1938 | Jeffrey | 254—29 |
| 2,958,125 | 11/1960 | Nichols | 29—237 |

FOREIGN PATENTS 85,676  2/1936  Sweden.

ROBERT C. RIORDON, Primary Examiner

J. C. PETERS, Assistant Examiner